United States Patent [19]
Sennowitz

[11] 3,761,673
[45] Sept. 25, 1973

[54] ARC GAP CURRENT MONITOR CIRCUIT

[75] Inventor: Kurt H. Sennowitz, Royal Oak, Mich.

[73] Assignee: Electronic Removal of Metals, Inc., Clawson, Mich.

[22] Filed: Jan. 11, 1972

[21] Appl. No.: 217,005

[52] U.S. Cl. ............................................. 219/69 S
[51] Int. Cl. ............................................. B23p 1/08
[58] Field of Search ................ 219/69 C, 69 G, 69 S

[56] References Cited
UNITED STATES PATENTS

| | | | |
|---|---|---|---|
| 3,311,782 | 3/1967 | Smith et al.................... | 219/69 C X |
| 3,542,989 | 11/1970 | Sennowitz...................... | 219/69 C |

*Primary Examiner*—R. F. Staubly
*Attorney*—Irving M. Weiner

[57] ABSTRACT

An arc gap current monitor circuit for use in an electrical discharge machining apparatus which includes a phase inverter stage connected between the main power supply and the arc gap. The monitor circuit protects the electrode tool and the conductive workpiece from damage due to direct current arcing caused by sludging, coolant loss, or breaking or chipping of the tool electrode. The trigger signal for the monitor circuit is not taken directly from the arc gap, and no resistance-capacitance or diode coupled signal is discharged into the arc gap. The arc gap monitor circuit also provides an automatic delay time during a shorted arc gap condition.

10 Claims, 1 Drawing Figure

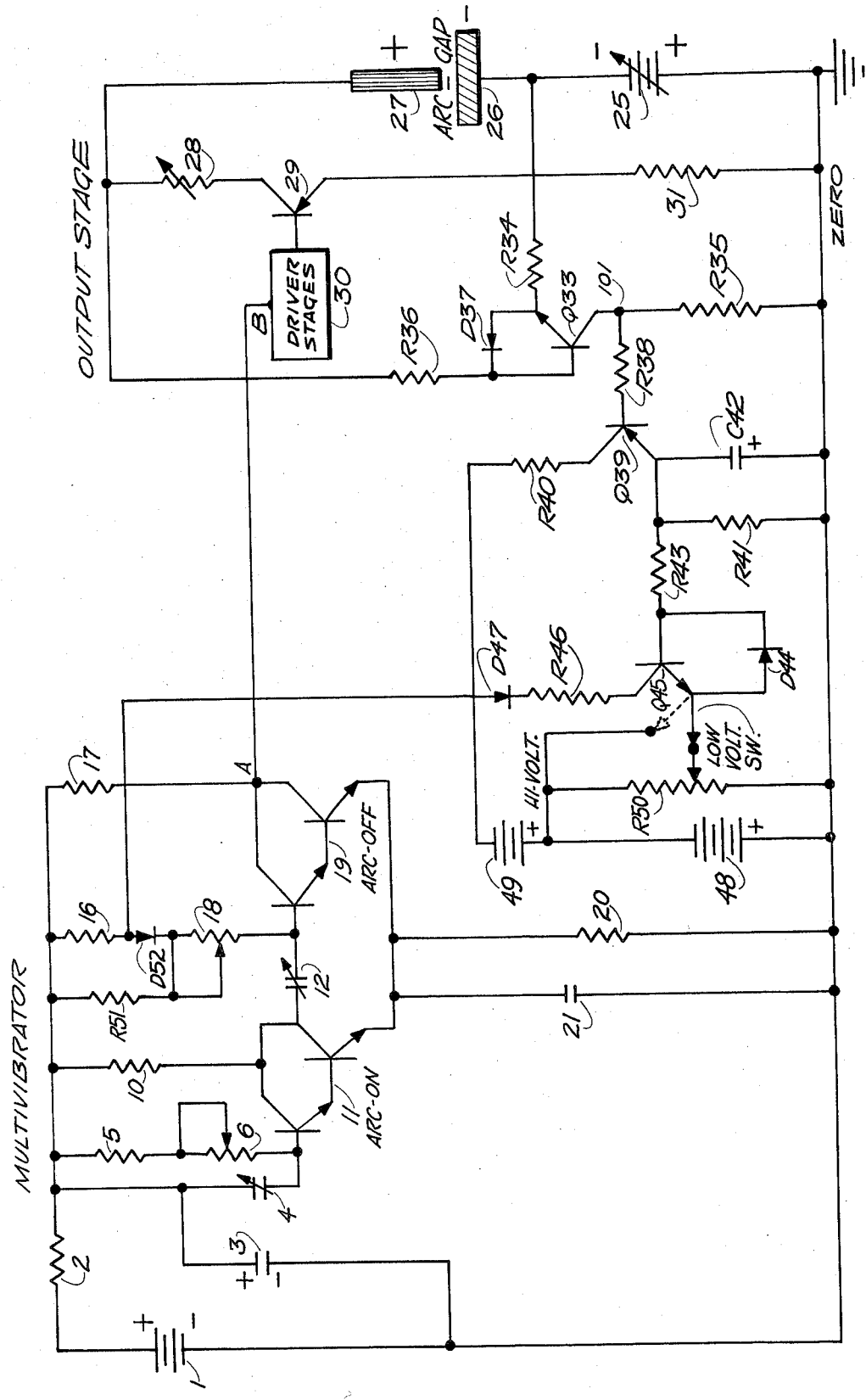

ARC GAP CURRENT MONITOR CIRCUIT

The present invention relates to an arc gap current monitor circuit, and in particular relates to an improved arc gap current monitor circuit especially adapted for use in electrical discharge machining apparatus wherein the monitor circuit includes a phase inverter stage and provides an automatic delay time during a shorted arc gap condition.

BACKGROUND OF THE INVENTION

In the operation of electrical discharge machining equipment, it is highly desirable and necessary to protect the electrode tool and the conductive workpiece from damage arising from a direct current arcing caused by sludging, coolant loss, breaking or chipping of the electrode, etc. Conventional arc gap current monitor circuits derive their trigger signal directly from the arc gap between the electrode tool and the conductive workpiece. Moreover, in conventional electrical discharge machining having arc gap current monitor circuits, a resistance-capacitance or diode coupled signal is discharged into the arc gap.

The arc gap current due to a shorting condition between the conductive workpiece and the tool electrode should read about zero after a slight delay time depending upon the frequency and the amperage employed during the cutting operation. If the cutting current reads zero within a few microseconds during a sludge-arc, the operation would be jittery, unstable and oscillatory. Consequently, this will result in slow cutting and too many back-ups of the electrical discharge machining equipment.

The arc gap current monitor circuit provided by the present invention eliminates the disadvantages and undesirable conditions described above.

SUMMARY OF THE INVENTION

The present invention provides an arc gap current monitor circuit particularly adapted for use in an electrical discharge machining apparatus wherein workpiece material is removed by periodic machining power pulses transferred between a tool electrode and a conductive workpiece across an arc gap. The electrical discharge machining apparatus includes an output first electronic control device operatively connected between a main power supply and the arc gap for providing periodic machining power pulses to the arc gap at predetermined ON-OFF times and frequencies. The arc gap current monitor circuit has phase inverter stage means operatively connected between the main power supply and the arc gap. The phase inverter stage means includes a second electronic control device having a control electrode and a pair of power electrodes. A first impedance component is operatively connected between the arc gap and the control electrode of the second electronic control device. A second impedance component is operatively connected between a first terminal of the main power supply and one of the power electrodes of the second electronic control device. A third impedance component is operatively connected between the arc gap and the other power electrode of the second electronic control device.

It is an object of the present invention to provide an arc gap current monitor system for an electrical discharge machining power supply in which machining pulses are provided by a switch or an electronic control device at predetermined frequency and OFF-times.

It is a further object of the present invention to provide an arc gap current monitor circuit wherein the trigger signal for the monitor circuit is not taken directly from the arc gap.

Another object of the present invention is to provide an arc gap current monitor circuit wherein no resistance-capacitance or diode coupled signal is discharged into the arc gap.

A further object of the present invention is to provide an arc gap current monitor circuit which renders an automatic delay time during a shorted arc gap condition.

BRIEF DESCRIPTION OF THE DRAWING

The drawing illustrates a schematic of an electrical discharge machining arc gap current monitor circuit in accordance with the principals of the present invention.

DETAILED DESCRIPTION OF THE INVENTION

In the drawing, the direct current supplies have been illustrated as batteries in the interest of simplifying the drawing and the description thereof. In actual practice, these sources of direct current may be derived from the secondary of a transformer having its primary connected to the power source for the electrical discharge machining apparatus which may be single phase or polyphase alternating current. The secondary voltage may be rectified and stored, usually in an electrolytic storage capacitor to form a nearly ideal direct current source having a very low internal impedance.

The term "electronic control device" as used herein is intended to mean any electronic switching device having three or more electrodes comprising at least two principal power electrodes acting to control current flow in the power circuit, the conductivity between the power electrodes being controlled by a control electrode within the device whereby the conductivity of the power circuit is controlled statically or electrically without the movement of mechanical elements within the device. Included within this definition are vacuum tubes, transistors, and other solid-state devices in which the turn-ON is accomplished by a control voltage applied to the control electrode and in which the turn-OFF is accomplished automatically in response to the removal of that control voltage.

With reference to the drawing, there is illustrated the novel arc gap current monitor circuit operatively connected between the output stage of an electrical discharge machining system and the pulse means or multivibrator therefor. The output stage consists of the variable main direct current supply 25, the resistor 31, the output first electronic control device or switch 29, the variable resistor 28, the driver stages 30, and the arc gap formed between the conductive workpiece 26 and the electrode tool 27. Terminal B is connected to terminal A which is the output of the pulse means or multivibrator. The pulse means or multivibrator may be substantially similar to the multivibrator which is described in greater detail in the copending patent application filed concurrently herewith in the name of Kurt H. Sennowitz entitled "ASTABLE FREE-RUNNING MULTIVIBRATOR."

The drawing depicts the arc gap current monitor circuit for the electrical discharge machining power supply in which machining pulses are provided by the output first electronic control device or switch 29 at predetermined frequency and OFF times. The current monitor circuit protects the tool electrode 27 and the conductive workpiece 26 from damage due to direct current arcing. The arc gap current due to a short between the conductive workpiece 26 and the tool electrode 27 should read about zero after a slight delay time depending on the frequency and amperage employed during the cutting operation.

The arc gap current monitor circuit includes a phase inverter stage which follows or senses and responds to the conditions in the arc gap. The phase inverter stage includes the second electronic control device or NPN inverter transistor Q33, the first impedance component or drive coupling resistor R36, the protective diode D37, and the divider network consisting of the second impedance component or load resistor R35 and the third impedance component or load resistor R34. In a preferred embodiment of the present invention, it has been found advantageous to make the resistance value of load resistors R34 and R35 substantially equal. In a working embodiment of the present invention, it has also been found advantageous to make the resistance value of variable resistor R28 much greater than the resistance value of resistor R31.

It is essential to note that the trigger signal for the monitor circuit is not taken or derived directly from the arc gap between the electrode 27 and the workpiece 26. It is also important to note that no resistance-capacitance or diode coupled signal is discharged into the arc gap.

It has been found advantageous in practice to have an extra inverter switch or electronic control device to make the circuit operate properly because of the common zero level of the multivibrator, the drive stages 30, and the positive direct current supply with the arc gap in the collector of the output stage or transistor 29.

Another feature of the present invention resides in the automatic delay time, during a shorted arc gap condition, caused by or derived from the three transistor stages, the second electronic control device Q33, the third electronic control device Q39 and the fourth electronic control device Q45, with some assistance of the capacitance C42. This automatic time delay is important for stable cutting during a slight shorting condition. If the cutting current would go to within a few microseconds during a momentary short caused by vibration or metal sludge flushing, the operation would be jittery, unstable and oscillatory. This would means slow cutting and too many back-ups.

DESCRIPTION OF OPERATION

During normal operation or cutting of the electrical discharge machining apparatus, the NPN inverter transistor Q33 switches OFF and ON like the arc gap frequency. Transistor Q33 has its base-emitter junction shunted by the protective diode D37.

If the arc gap shorts, the base or control electrode of the inverter transistor Q33 receives a negative signal from the negative terminal of the variable main direct current supply 25 to turn OFF the transistor Q33. The plus or positive signal turns OFF PNP transistor Q39. The resistance-capacitance network consisting of resistor R41 and capacitance C42 keeps or maintains the coupling resistor R43 negative until the capacitance C42 discharges and places a positive voltage on the base electrode of transistor Q45 with respect to the emitter of transistor Q45 to turn ON the transistor Q45. Diode D44 limits the base emitter junction of transistor Q45 from excess turn-OFF voltage.

The variable potentiometer R50 couples a predetermined or preset negative voltage through the NPN switch or transistor Q45 over the load resistor R46 and the decoupling diode D47 to the multivibrator junction between the diode D52 and the resistor 16. To hold the multivibrator in an OFF condition for several milliseconds until the resistor 18, the variable capacitance 12, and the resistor R51 turn ON the electronic control device 19 for several microseconds depending on the multivibrator frequency setting. It is preferrable to have the resistor R51 a high value resistor to give the multivibrator a long OFF-time, i.e., a long resistance-capacitance time constant in conjunction with the variable capacitance 12.

The low frequency pulse turns ON the output stage transistor 29. It should be noted that the output from the multivibrator at terminal A is connected to terminal B of the driver stages 30. This narrow pulse or pulses draw a very small current through the plus and minus arc to prevent damage to the workpiece 26 and the electrode 27. During a "hard" short across the arc gap, the current will read only a few milliamperes to protect the workpiece 26.

The direct current supply 48 will provide the negative voltage for the transistor Q45 to change the multivibrator frequency automatically suited for every cutting level from very fine finishes to rough cutting. The direct current supply 49 in conjunction with the transistor Q39 is employed to charge the condenser D42 and to provide the turn-OFF bias for the transistor Q45.

It should also be noted that the second electronic control device or inverter transistor Q33 may also be employed to sense the servomechanism powerfeed circuit. The transistor Q33 couples or transfers half of the signal voltage to transistor Q39 because of the divider network consisting of load resistors R34 and R35. In this connection it should be noted that it is novel to operate and sense a high voltage electrical discharge machining power supply without the necessity of making any circuit changes. In a preferred embodiment of the present invention, the variable direct current main supply 25 may vary from 80 to 200 volts.

Another feature of the present invention resides in the fact that no stored energy is discharged into the arc gap which could give trouble at very high frequency operation.

Another feature of the embodiment illustrated in the drawing resides in the low voltage switch connected to the emitter electrode of transistor Q45. When the variable main direct current supply 25 is at the lower voltage level, the emitter electrode or transistor Q45 is connected to a fixed point on the variable potentiometer R50. During high voltage operation, the emitter electrode of the transistor Q45 is automatically switched to the high voltage end of the variable potentiometer R50. In practice it has been found that the high voltage reference has given better protection and faster response to abnormal arc conditions, especially when using metal tool electrodes or steel on steel die spotting.

I claim:

1. In an electrical discharge machining apparatus wherein workpiece material is removed by periodic machining power pulses transferred between a tool electrode and a conductive workpiece across an arc gap, including an output first electronic control device operatively connected between a main power supply and said arc gap for providing periodic machining power pulses to said arc gap at predetermined ON-OFF times and frequencies, wherein the improvement comprises:

an arc gap current monitor circuit having phase inverter stage means operatively connected between said main power supply and said arc gap;

said phase inverter stage means including a second electronic control device having a control electrode and a pair of power electrodes;

a first impedance component operatively connected in series circuit between said arc gap and said control electrode of said second electronic control device;

a second impedance component operatively connected in series circuit between a first terminal of said main power supply and one of said power electrodes of said second electronic control device; and a third impedance component operatively connected in series circuit between said arc gap and the other power electrode of said second electronic control device;

whereby the occurrence of a shorting condition in said arc gap will render said second electronic control device non-conductive.

2. The combination according to claim 1, including an electrical component operatively connected between said control electrode of said second electronic control device and said other power electrode of said second electronic control device, said electrical component having a substantially low impedance to the flow of electrons in a predetermined direction and having a substantially greater impedance to the flow of electrons in a direction opposite to that of said predetermined direction.

3. The combination according to claim 1, including:
a third electronic control device operatively connected to said second electronic control device,
and a fourth electronic control device operatively connected to said third electronic control device,
whereby the occurrence of a shorting condition in said arc gap will render said second and third electronic control devices non-conductive and will render said fourth electronic control device conductive.

4. In an electrical discharge machining apparatus wherein workpiece material is removed by periodic machining power pulses transferred between a tool electrode and a conductive workpiece across an arc gap, including an output first electronic control device operatively connected between a main power supply and said arc gap for providing periodic machining power pulses to said arc gap at predetermined ON-OFF times and frequencies, wherein the improvement comprises:

an arc gap current monitor circuit having phase inverter stage means operatively connected between said main power supply and said arc gap;

said phase inverter stage means including a second electronic control device having a control electrode and a pair of power electrodes;

a first impedance component operatively connected between said arc gap and said control electrodes of said second electronic control device;

a second impedance component operatively connected between a first terminal of said main power supply and one of said power electrodes of said second electronic control device;

a third impedance component operatively connected between said arc gap and the other power electrode of said second electronic control device;

a third electronic control device operatively connected to said second electronic control device;

a fourth electronic control device operatively connected to said third electronic control device;

whereby the occurrence of a shorting condition in said arc gap will render said second and third electronic control devices non-conductive and will render said fourth electronic control device conductive;

drive means operatively connected to the control electrode of said output first electronic control device for rendering said output first electronic control device alternately conductive and non-conductive;

pulse means operatively connected to said drive means for operating said drive means with pulses of predetermined ON-OFF times;

and coupling means operatively connected between said fourth electronic control device and said pulse means for coupling a predetermined voltage from said fourth electronic control device to said pulse means, when said fourth electronic control device has been rendered conductive, to cause said pulse means to have a substantially long OFF time.

5. The combination according to claim 4, wherein said coupling means includes a variable potentiometer.

6. The combination according to claim 5, wherein said main power supply is a variable power supply,
and including a low voltage switch operatively connected between a predetermined point on said variable potentiometer and one of the power electrodes of said fourth electronic control device, whereby during low voltage operation of said main power supply said power electrode of said fourth electronic control device is connected to said predetermined point of said variable potentiometer, and during high voltage operation of said main power supply said power electrode of said fourth electronic control device is automatically switched to the high voltage end of said variable potentiometer.

7. The combination according to claim 4, wherein said pulse means comprises a multivibrator having a pair or electronic control devices biased for alternate operation, and a pair of resistance-capacitance networks each operatively connected to a control electrode of one of said pair of electronic control devices, respectively;

a diode element operatively connected in the resistance portion of one of said resistance-capacitance networks;

and said coupling means being operatively connected to one terminal of said diode element to feed a predetermined voltage to said multivibrator through said fourth electronic control device when said fourth electronic control device has been rendered conductive in response to a shorting condition between said tool electrode and said conductive workpiece.

8. The combination according to claim 7, wherein said first, second and third impedance components are each a resistance element, and wherein the trigger signal for said arc gap current monitor circuit is not taken directly from said arc gap, and no resistance-capacitance or diode coupled signal is discharged into said arc gap, and including a substantially high resistance element connected to the other terminal of said diode element, which high resistance element in conjunction with the capacitance of said one resistance-capacitance network provides a long time constant to give said multivibrator a long OFF time.

9. The combination according to claim 1 including:
   drive means operatively connected to the control electrode of said ouput first electronic control device for rendering said output first electronic control device alternately conductive and nonconductive;
   a multivibrator operatively connected to said drive means for supplying said drive means with a series of substantially rectangular wave pulses;
   said multivibrator having a pair of electronic control devices biased for alternate operation;
   a pair or resistance-capacitance networks each operatively connected to a control electrode of one of said pair of electronic control devices, respectively;
   and means operatively connected to said multivibrator for independently varying the interpulse period and the pulse width of said series of substantially rectangular wave pulses generated by said multivibrator.

10. In an electrical discharge machining apparatus wherein workpiece material is removed by periodic machining power pulses transferred between a tool electrode and a conductive workpiece across an arc gap, including an output first electronic control device operatively connected between a main power supply and said arc gap for providing periodic machining power pulses to said arc gap at predetermined ON-OFF times and frequencies, wherein the improvement comprises:
    an arc gap current monitor circuit having phase inverter stage means operatively connected between said main power supply and said arc gap;
    said phase inverter stage means including a second electronic control device having a control electrode and a pair of power electrodes;
    a first impedance component operatively connected between said arc gap and said control electrodes of said second electronic control device;
    a second impedance component operatively connected between a first terminal of said main power supply and one of said power electrodes of said second electronic control device;
    a third impedance component operatively connected between said arc gap and the other power electrode of said second electronic control device; and
    wherein said second and third impedance components are resistance elements having substantially equal values of resistance.

* * * * *